United States Patent
Vincitore

(10) Patent No.: US 8,227,120 B2
(45) Date of Patent: Jul. 24, 2012

(54) VOLATILE ORGANIC COMPOUND ABATEMENT WITH FUEL CELL POWER PLANT

(75) Inventor: Antonio M. Vincitore, Sourth Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 338 days.

(21) Appl. No.: 12/452,701

(22) PCT Filed: Jul. 20, 2007

(86) PCT No.: PCT/US2007/016510
§ 371 (c)(1),
(2), (4) Date: Jan. 15, 2010

(87) PCT Pub. No.: WO2009/014512
PCT Pub. Date: Jan. 29, 2009

(65) Prior Publication Data
US 2010/0136443 A1    Jun. 3, 2010

(51) Int. Cl.
*H01M 8/06* (2006.01)

(52) U.S. Cl. ........ 429/416; 429/423; 429/434; 429/500; 422/187

(58) Field of Classification Search .................. 429/416, 429/417, 423–425, 433–435, 444, 500; 422/187, 422/198, 139, 146, 158
See application file for complete search history.

(56) References Cited

U.S. PATENT DOCUMENTS

| 4,080,791 A | * | 3/1978 | Nadler et al. | .................. 60/670 |
| 6,893,754 B2 | * | 5/2005 | Agar et al. | .................. 429/424 |
| 2007/0104983 A1 | * | 5/2007 | Wakita et al. | .................. 429/19 |

* cited by examiner

*Primary Examiner* — Raymond Alejandro
(74) *Attorney, Agent, or Firm* — M. P. Williams

(57) ABSTRACT

Absorbent material in a regenerable volatile organic compound (VOC) apparatus (15) is regenerated by a flow (92) of desorption gas heated (90) by exhaust (87) of a burner (58) of a reformer (57), which reforms hydrocarbon fuel (55) to generate hydrogen-rich reformate gas that is provided (46, 48, 61) to anodes of a fuel cell (64), steam (83) from fuel cell coolant (73, 79) being provided (62, 56) to said reformer. The fuel may be desulfurized (53) using the reformate gas (44, 45). The reformate may be enriched by a shift reactor (48).

13 Claims, 2 Drawing Sheets

VOLATILE ORGANIC COMPOUND ABATEMENT WITH FUEL CELL POWER PLANT

TECHNICAL FIELD

A volatile organic compound (VOC) abatement system burns VOC desorbent effluent to power a reformer which converts hydrocarbon fuel to hydrogen for operating a fuel cell power plant, the steam in the fuel cell power plant coolant outflow being applied to the reformer, a portion of the anode effluent may be used to enhance burning of the VOC effluent in the reformer; reformer burner exhaust heats desorbent gas.

BACKGROUND ART

Environmental regulations are becoming more stringent with a greater emphasis on the reduction of gaseous emissions from factories, especially volatile organic compounds which may include, for example, ethanol, acetone, isopropyl alcohol, heptanone, or triethanolamine. One example of current VOC abatement technology includes a VOC concentrator (absorber) coupled with a thermal oxidizer to burn the desorbent (regeneration) effluent gas, as shown in FIG. 1. A laboratory, or a factory 10 or other facility, typically includes extensive duct work used to collect localized hot air, gases, fumes or dust from process operations. Some process operations may be vented or filtered, some are enclosed or hooded to provide maximum collection efficiency.

The exhaust 13 from the factory 10 typically includes volatile organic compounds (VOCs) which are abated by being absorbed in regenerative absorbent apparatus 15 which may typically comprise slowly rotating drum devices, on which successive increments of zeolite beds absorb the VOCs and are subsequently desorbed, repetitively. Or the absorbent apparatus may comprise push/pull alternate beds in which one bed is absorbing while the other is being desorbed, and then the reverse occurs.

The output 17 of the regenerative VOC absorber 15 is clean air which is typically released to ambient. The effluent 20 from the desorption phase in the regenerative VOC absorber 15 is applied by a blower 21 over a conduit 22 to a burner 23 of a thermal oxidizer 24, which burns the vaporous regeneration effluent along with natural gas 25 and air 26 from a blower 28. The hot outflow of the burner 23 is passed through an oxidizer 31, the output 32 of which is partially released to ambient and partially mixed with fresh air 35 and applied to a blower 38. The blower output 40, applied to the desorption gas inlet 41 of the apparatus 15, is used as the desorption gas in the regenerative VOC adsorber 15.

The apparatus of FIG. 1 therefore utilizes natural gas simply to burn the VOC regenerative products.

While the apparatus of FIG. 1 is an adequate solution to meeting near-term permitted air standards, efficient, sustainable operations therewith are limited. Most of the heat generated by the natural gas passes to ambient in the clean exhaust 32. The pumping in of additional cooling air 35, 38 illustrates the waste of fuel.

SUMMARY

VOC abatement utilizes burned desorbent effluent to power a catalytic steam reformer or an autothermal reformer, which generates hydrogen-rich reformate gas that powers a fuel cell power plant. Some portion of the generated reformate (perhaps about 15%-20%, for example) may be drawn from the fuel cell anode exhaust to enrich the burner fuel; some of the reformate may be used in a hydrodesulfurizer; steam from the coolant exhaust of the fuel cell may be fed to the reformer to provide heat and moisture. Heat from the reformer heats the VOC desorbent gas.

The arrangement described herein does not conduct much generated heat into the ambient, but rather utilizes it to generate electricity. The electricity generated by the fuel cell can simply be sold to a utility grid, or it may be utilized to power critical operations in the factory, such as VOC abatement, or a combination of those and/or other uses. One option is to ensure continuous operation of the VOC abatement system in the event of either a planned or unplanned power shutdown on the utility grid.

An example of a combination of a typical, available, stationary fuel cell power plant with an operating semiconductor production facility is pairing a 200 kW phosphoric acid fuel cell with the semiconductor factory that produces about 31,000 pph (pounds per hour) of air containing about 5 pph VOCs. The regeneration requirement for that amount of VOCs is about 540 pph of hot desorbent gas, such as air at 475° F. (246° C.). This amount of air heated to 475° F. (246° C.) is readily achieved with a hydrocarbon reform reactor that produces sufficient hydrogen to operate the aforementioned 200 kW phosphoric acid fuel cell power plant, when the fuel cells are operating at 80% fuel utilization, allowing 20% of the hydrogen inputted to the fuel cell anodes to exit in the effluent of the fuel cells to enrich the burning in the reform reactor. The 80% utilization also assures that there will be no fuel starvation in any part of the fuel cell. Burning the anode effluent eliminates the hazard of exhausting $H_2$ into the atmosphere and assures adequate hydrogen efficiency.

Other variations will become apparent in the light of the following detailed description of exemplary embodiments, as illustrated in the accompanying drawings.

MODE(S) OF IMPLEMENTATION

Figure 2:
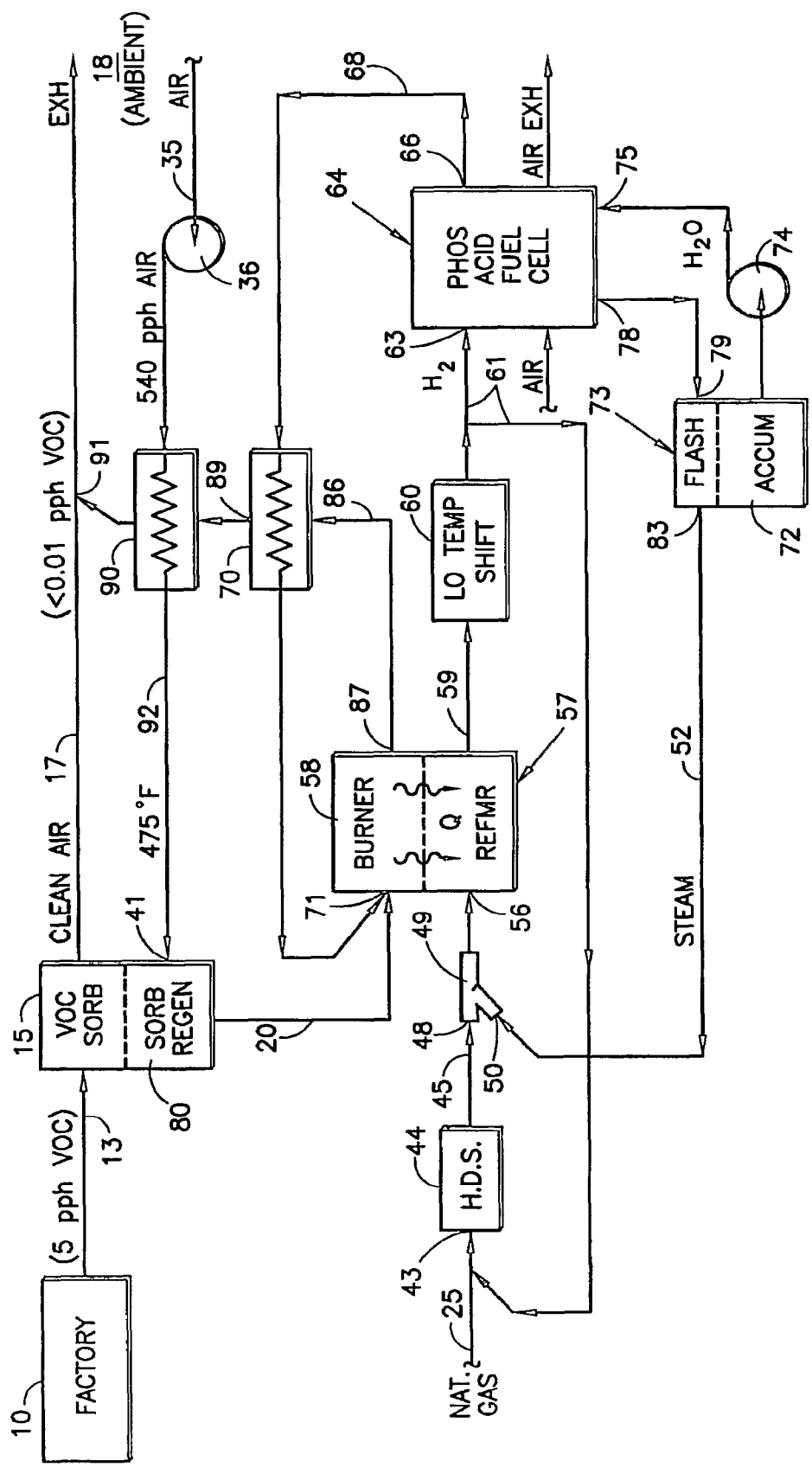
FIG. 2 is a simplified, schematized block diagram of a VOC abatement system combined with a fuel cell as described hereinafter.

Referring to FIG. 2, hydrocarbon fuel, such as natural gas 25 is provided to the inlet 43 of a hydrodesulfurizer 44 which reduces sulfur in the fuel stream in the known fashion. The desulfurized hydrocarbon fuel is applied in a conduit 45 to the main inlet 48 of an ejector 49, which applies vacuum to a secondary inlet 50 that receives steam in a conduit 52. The output 50 of the ejector 49 is provided to an inlet 56 of a catalytic steam reformer 57 that derives its heat, Q, from a burner 58.

The outflow from the reformer 57 in a conduit 59 comprises reformate which may, for example, be about 53% $H_2$, 7% CO, and 8% $CO_2$ with traces of other gases and unreformed hydrocarbons. The reformate is applied to a low temperature shift reactor 60 to convert CO into additional hydrogen, which is applied in a conduit 61 to the inlet 43 of the HDS 44 as well as to the anode inlets 63 of a phosphoric acid fuel cell 64. The anode outlets 66 provide hydrogen in a conduit 68 through a heat exchanger 70 to an inlet 71 of the burner 58.

Coolant is supplied to the fuel cell power plant 64 from an accumulator 72, such as in a flash drum 73, through a coolant pump 74 to inlets 75 of the coolers, typically consisting of plates interspersed between groups of fuel cells (on the order of 4-8 fuel cells per group). The coolant outlet 78 provides the biphase coolant (steam, water) to a flash input 79 of the flash drum 73. While the water reverts to the accumulator 72, steam from the steam outlet 83 of the flash drum is applied by conduit 52 to the secondary inlet 50 of the ejector 49 to provide the moisture for the reformation process.

The effluent from the absorbent regeneration (desorption) portion 80 of the regenerative VOC absorber 15 is provided in conduit 20 to the burner inlet 71. Hydrogen from the fuel cell anode exhaust 66 and the products of desorbing the zeolites, which may include, for example, such compounds as ethanol, acetone, isopropyl alcohol, heptanone or triethanolamine, are consumed in the burner portion 58 of the catalytic steam reformer 57, and the exhaust in the outlet 87 of the burner is passed by conduit 86 through the heat exchanger 70 to heat the hydrogen effluent, such as from about 300° F. (149° C.) to about 670° F. (354° C.).

From the outlet 89 of the heat exchanger 70, the warm burner exhaust is applied to a heat exchanger 90 that is a principal part of this apparatus: to wit, it heats the required volume of air to the required temperature, such as, in this example, on the order of 500 pph of air in a conduit 92 to about 475° F. (246° C.) in order to regenerate the zeolite absorbent that converts 5 pph of VOCs to clean air. The exhaust of the heat exchanger 90 at an outlet 91 is fed to ambient.

The arrangement of FIG. 2 is a good match because the amount of heat that the burner can supply, by consuming (a) only about 15% to about 20% of the reformate it generates (and preheats) and (b) the sorbent regeneration exhaust, can exactly match the heat required to provide the absorbent gas, for a typical factory, as well as provide a useful amount of electricity from the bulk of the reformate, while the fuel cell provides steam for the reformer. The result is a highly energy-efficient treatment of VOCs.

Figure 1:
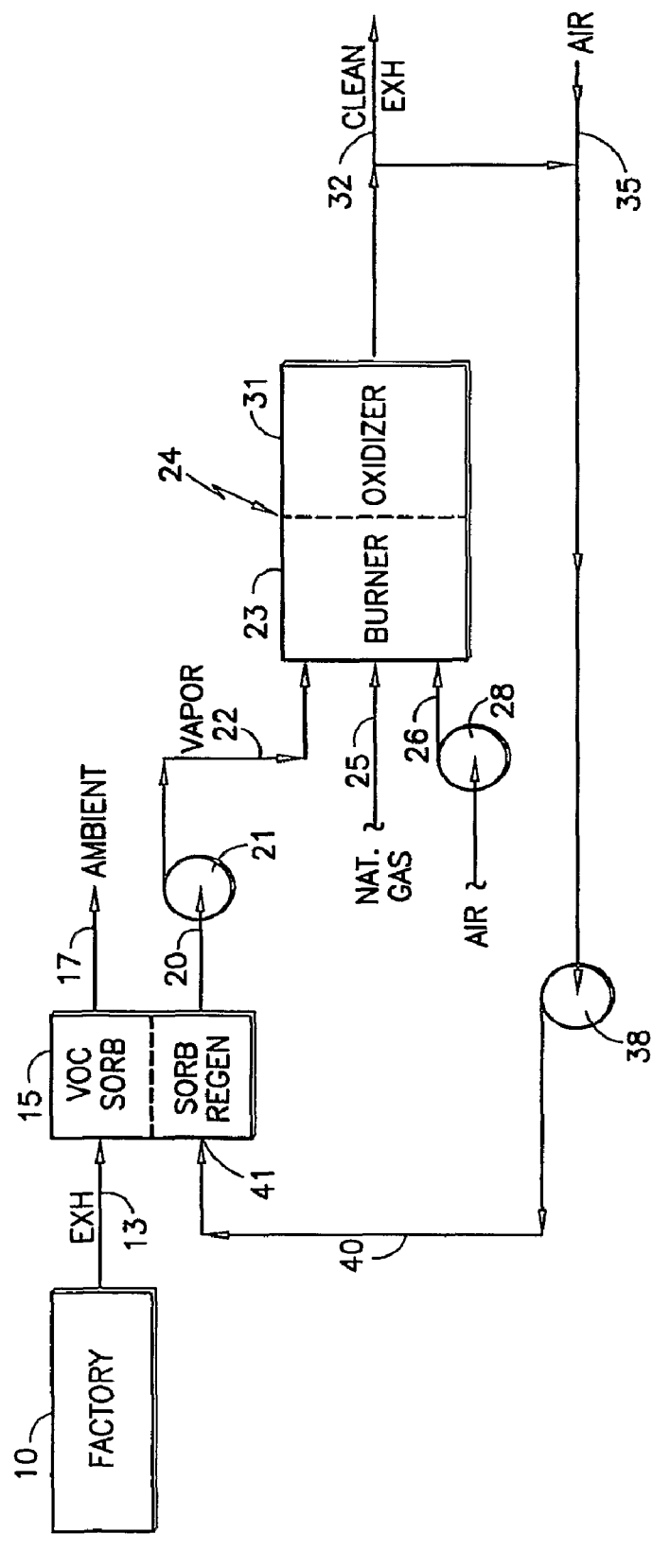
FIG. 1 is a simplified, stylized block diagram of a VOC abatement system known to the prior art.

Stated alternatively, whereas apparatus described with respect to FIG. 1 discharges substantially all of the heat content of the incoming fuel to the atmosphere, the arrangement herein described with respect to FIG. 2 may discharge as low as about 20% of the heat content of the incoming fuel to the atmosphere as waste heat. The waste heat may be even less if a use can be found for the low grade (low temperature) heat at the outlet 91 of the heat exchanger 90.

The anode exhaust in the configuration of FIG. 2 is substantially cleansed of any hydrogen in the burner 58, and heat therefrom is transferred to the desorption process, thus contributing to cleaner overall system output.

The invention claimed is:

1. A system comprising:
a regenerable volatile organic compound absorption apparatus (15) configured to receive a flow (13) of gas containing volatile organic compounds and configured to regenerate absorbent material therein by means of a flow (92) of hot desorption gas provided to a desorption gas inlet (41) of said apparatus;
a burner (58) with exhaust, said burner configured to burn desorption effluent from a desorption gas outlet (20) of said apparatus;
wherein the improvement comprises:
said burner is part of a reformer (57) configured to reform hydrocarbon fuel (55) to provide hydrogen-containing reformate gas (61);
heat transfer apparatus (90) for transferring heat from the exhaust of said burner to said desorption gas, said heat transfer apparatus configured to deliver (90) heated desorption gas to said inlet; and
a fuel cell power plant (64) having anodes to which at least some of said hydrogen-containing reformate gas is provided (48, 46, 63), wherein said fuel cell power plant (64) is a phosphoric acid fuel cell power plant.

2. A system according to claim 1 wherein:
said fuel cell power plant (64) having biphase water coolant exiting (78) from said fuel cell power plant;
and further comprising:
a steam separator (73) configured to provide steam (82, 83) derived from said exiting coolant to said reformer.

3. A system according to claim 1 further comprising:
a hydrodesulfurizer (53) adapted to receive hydrocarbon feed (25) and provide said hydrocarbon fuel (55) to said reformer (57), some of said hydrogen-containing reformate gas being provided (44, 45, 46) to said hydrodesulfurizer.

4. A system according to claim 1 further comprising:
a connection (68, 70) from anode outlets (66) of said fuel cell (64) to the inlet (71) of said burner (58).

5. A system according to claim 4 wherein:
said connection includes a heat exchanger (70) through which said burner exhaust (87) flows (86).

6. A system according to claim 1 further comprising:
a shift reactor (48) connected (61, 46) between said reformer (57) and said fuel cell power plant (64).

7. A system according to claim 6 wherein:
flow of gas from said shift reactor is connected (44, 45, 48) to an inlet (50) of a hydrodesulfurizer (53) which is configured to receive hydrocarbon feed stock (25) and provide said hydrocarbon fuel (55) to said reformer (57).

8. A method comprising:
absorbing volatile organic compounds from a flow (13) of gas in a regenerable absorption bed (15);
providing a flow (20) of desorption exhaust gas from said regenerable absorption bed to a fuel inlet (71) of a burner (58);
wherein the improvement comprises:
said providing step comprises providing said flow to a burner of a reformer (57) that generates hydrogen-rich reformate gas (61);
heating (90) air (35) with exhaust (86) of said burner to provide desorption gas (92) to said bed; and
reacting at least some of said reformate gas in a fuel cell power plant (64) to provide electric power, wherein said step of reacting comprises reacting reformate gas (61) in a phosphoric acid fuel cell power plant (64).

9. A method according to claim 8 wherein:
said providing step comprises providing a flow (92) of desorption exhaust gas from said regenerable absorption bed to a fuel inlet (71) of a burner (58) of a catalytic steam reformer (57).

10. A method according to claim 8 wherein:
a portion (68) of said reformate gas (61) is provided to said fuel inlet (71) of said burner (58).

11. A method according to claim 10 further comprising:
heating (70) said portion (68) of said reformate gas with exhaust (86) from said burner (57).

12. A method according to claim 10 wherein:
said portion (68) is between about 15% and about 20% of the reformate gas (61) generated by said reformer (57).

13. A method according to claim 8 further comprising:
providing to said reformer (57), steam (82) extracted (83) from coolant exhaust (78) of said fuel cell power plant (64).

* * * * *